US010072792B2

(12) United States Patent
Angelastro (10) Patent No.: US 10,072,792 B2
(45) Date of Patent: Sep. 11, 2018

(54) ADJUSTABLE STRAP CLIP

(71) Applicant: Leonard W. Angelastro, North Franklin, CT (US)

(72) Inventor: Leonard W. Angelastro, North Franklin, CT (US)

( * ) Notice: Subject to any disclaimer, the term of this patent is extended or adjusted under 35 U.S.C. 154(b) by 0 days.

(21) Appl. No.: 15/809,211

(22) Filed: Nov. 10, 2017

(65) Prior Publication Data

US 2018/0087713 A1    Mar. 29, 2018

Related U.S. Application Data

(62) Division of application No. 15/250,416, filed on Aug. 29, 2016, now Pat. No. 9,841,138.

(60) Provisional application No. 62/315,719, filed on Mar. 31, 2016.

(51) Int. Cl.
| | |
|---|---|
| *A46B 17/02* | (2006.01) |
| *F16M 13/02* | (2006.01) |
| *A47F 7/00* | (2006.01) |
| *F16B 2/20* | (2006.01) |
| *B25H 3/00* | (2006.01) |

(52) U.S. Cl.
CPC ........... *F16M 13/02* (2013.01); *A47F 7/0021* (2013.01); *B25H 3/00* (2013.01); *F16B 2/20* (2013.01)

(58) Field of Classification Search
CPC ......... F16M 13/02; A47F 7/0021; B25H 3/00; F16B 2/20
See application file for complete search history.

(56) References Cited

U.S. PATENT DOCUMENTS

| | | | | |
|---|---|---|---|---|
| 2,616,143 | A * | 11/1952 | Falkner | ................. A47L 13/512 |
| | | | | 211/65 |
| 4,062,087 | A | 12/1977 | Lingle | |
| 4,170,333 | A | 10/1979 | Angelastro | |
| 4,880,192 | A | 11/1989 | Hans Von Braucke et al. | |
| 6,010,105 | A | 1/2000 | Davis | |
| 6,125,723 | A | 10/2000 | Huang | |
| 7,546,990 | B1 * | 6/2009 | McGuire | .................. B25H 3/04 |
| | | | | 211/70.6 |

* cited by examiner

*Primary Examiner* — Amy J. Sterling
(74) *Attorney, Agent, or Firm* — Coleman & MacDonald Law Office (57) ABSTRACT

An adjustable hanger device including a base plate mountable to a support surface, and an elongated slide bar attached to the base plate and spaced apart therefrom. The hanger device includes a flexible strap, a first end of the strap is attached to an end of the slide bar, a length of the strap being disposed at a first angle relative to the length of the slide bar. An adjustable fastener is provided to adjustably secure the strap to the slide bar at a point between the first and second ends of the strap, the strap being twisted axially to form a spiral loop, the loop defining an opening disposed at a second angle relative to the length of the side bar; and wherein an implement can be supported via the hanger device by inserting the handle into the loop and allowing the implement to return to a vertical position.

5 Claims, 9 Drawing Sheets

ADJUSTABLE STRAP CLIP

CROSS-REFERENCE TO RELATED APPLICATIONS

This application is a divisional of U.S. patent application Ser. No. 15/250,416 filed Aug. 29, 2016, the entire disclosure of which is hereby incorporated by reference and claims priority from U.S. Provisional Patent Application No. 62/315,719 filed Mar. 31, 2016, the entire disclosure of which is hereby incorporated by reference.

FIELD OF THE INVENTION

The present disclosure relates generally to a hanger device for hanging tools or other implements by a handle or end portion of the tool or implement. More particularly, the disclosure relates to an adjustable hanger device mountable to a support surface for hanging tools or implements therefrom.

BACKGROUND OF THE INVENTION

The statements in this section merely provide background information related to the present disclosure and may not constitute prior art.

It is a common practice to store tools or other implements when not in use by hanging them on a wall or similar vertical supporting structure. Various forms of clamps and spring devices, usually formed of metal or plastic, are available for this purpose, however, many of these types devices but in general, they are difficult to use, do not function or wear well, and frequently damage the handle of the implement. In order to overcome these difficulties it has been proposed heretofore to use various elastic devices for clasping the implement handle as, for example, in accordance with the disclosure in French Pat. No. 1,383,396, to engage the handle of the implement in a stretched loop of elastic, but such fasteners are insecure particularly if the handle does not have an enlarged end, variations in the weight of the implement being suspended can be detrimentally critical, and the user must learn the technique for manipulating the handle and hanger in order to use it effectively.

U.S. Pat. No. 4,170,333 discloses a hanger device and method for suspending an implement from a handle thereof. The hanger device disclosed provides a flexible loop for receiving a handle of the tool to be suspended, but does not allow for handles of various sizes.

It is an object of the present teachings to provide an adjustable hanger device for hanging tools and implements that overcomes the shortcomings of prior art hanger devices.

SUMMARY OF THE INVENTION

This section provides a general summary of the disclosure and does provide a comprehensive description or include full scope or all the features of the subject matter disclosed.

In one aspect, the present invention provides an adjustable hanger device including a base plate mountable to a support surface, an elongated slide bar attached to the base plate, a flexible strap defining first and second ends, the first end of the strap attached to a first end of the slide bar, a length of the strap being disposed at a first angle relative to the length of the slide bar. The adjustable hanger further includes an adjustable fastener configured to adjustably secure the strap to the slide bar at a point between the first and second ends of the strap, the strap being twisted axially to form a spiral loop, the loop defining an opening disposed at a second angle relative to the length of the side bar; and wherein, an elongated portion of an implement when tilted at the second angle may be inserted into the loop, the strap being sufficiently flexible to permit the implement to be returned to a vertical position while the elongated portion of the implement is retained by tightening of the loop about the elongated portion of the implement.

In another aspect, the hanger device includes a base plate having a wall mount surface and a slide bar mount, the slide bar mount being disposed at an acute angle relative to the wall mount surface, the slide bar being attached to the slide bar mount.

In another aspect, the base plate defines the wall mount surface and the slide bar mount formed integrally one with other, at least one bend formed along a length of the base plate separates the wall mount surface from the slide bar mount.

In another aspect, the adjustable fastener includes a slide member and a spring clip, the spring clip being engageable with the slide member for securing a position of the flexible strap relative to the slide bar.

In another aspect of the invention, a strap clip is provided for adjustably securing a flexible strap against a slide bar. The strap clip including a slide member defining a rectangular shaped tube. The tube is configured to fit over the slide bar and to receive the flexible strap through the tube overlying the slidebar. A spring clip is provided to secure the flexible strap against a sidewall of the tube and thereby the slide bar.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description, the appended claims and the following drawings. The drawings are for illustrative purposes only and are not intended to limit the scope of the present disclosure.

DETAILED DESCRIPTION OF EMBODIMENTS OF THE INVENTION

Detailed illustrative descriptions of example embodiments are disclosed herein. However, specific structural and functional details disclosed herein are merely representative for purposes of describing example embodiments. The example embodiments may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
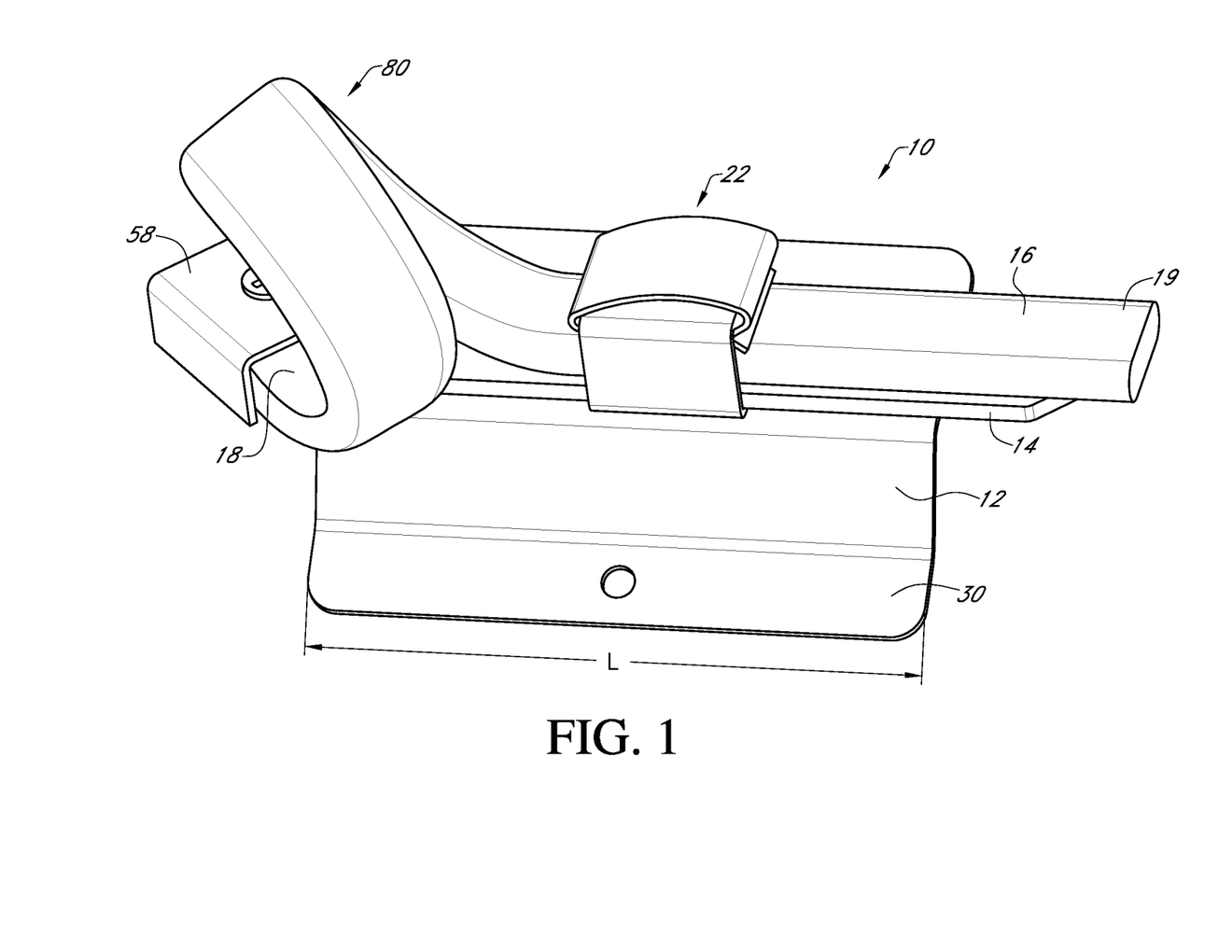
FIG. 1 is a perspective view of one embodiment of a hanger device in accordance with the present invention configured for left hand insertion of an implement handle.
Figure 2:
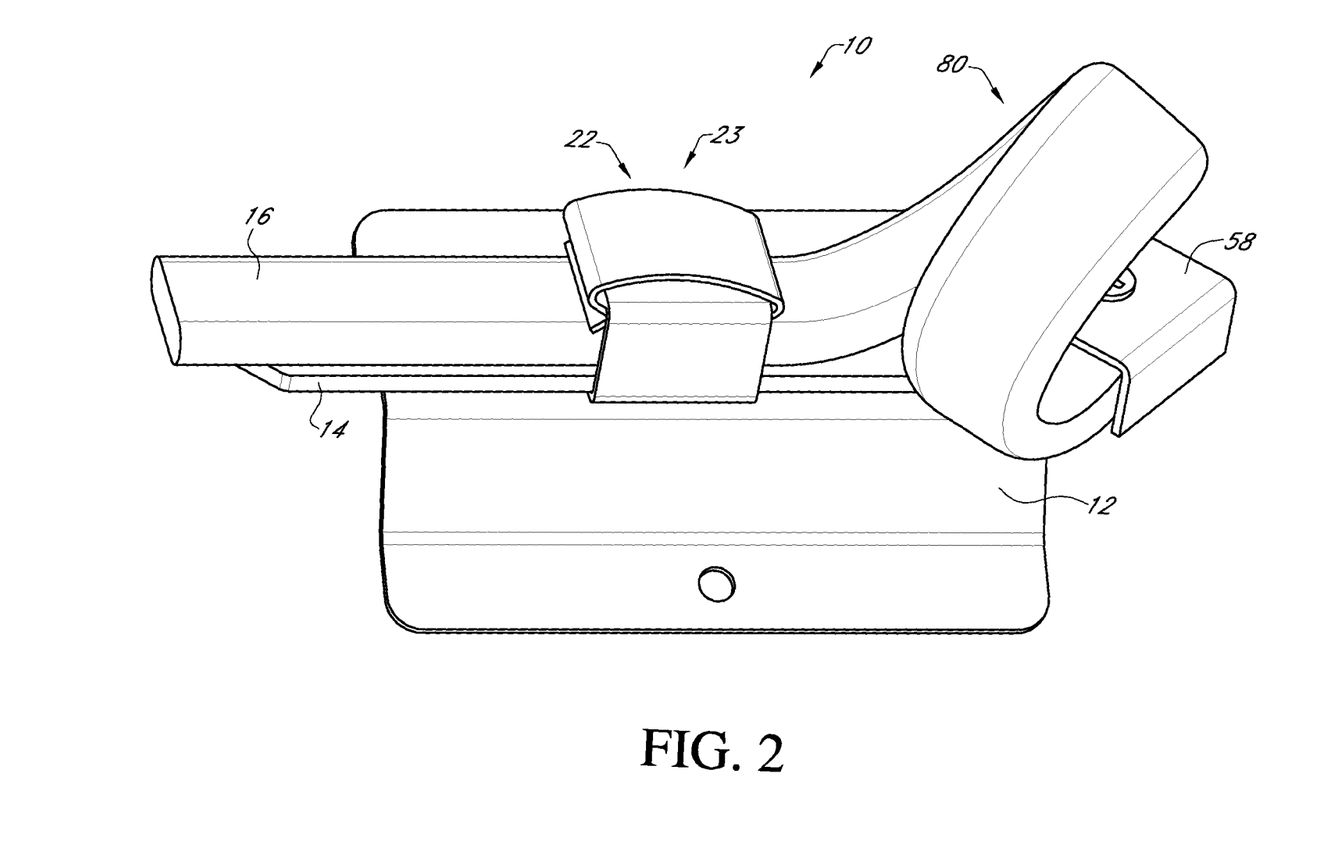
FIG. 2 is a perspective the hanger device of FIG. 1 configured for right hand insertion of an implement handle.
Figure 3:
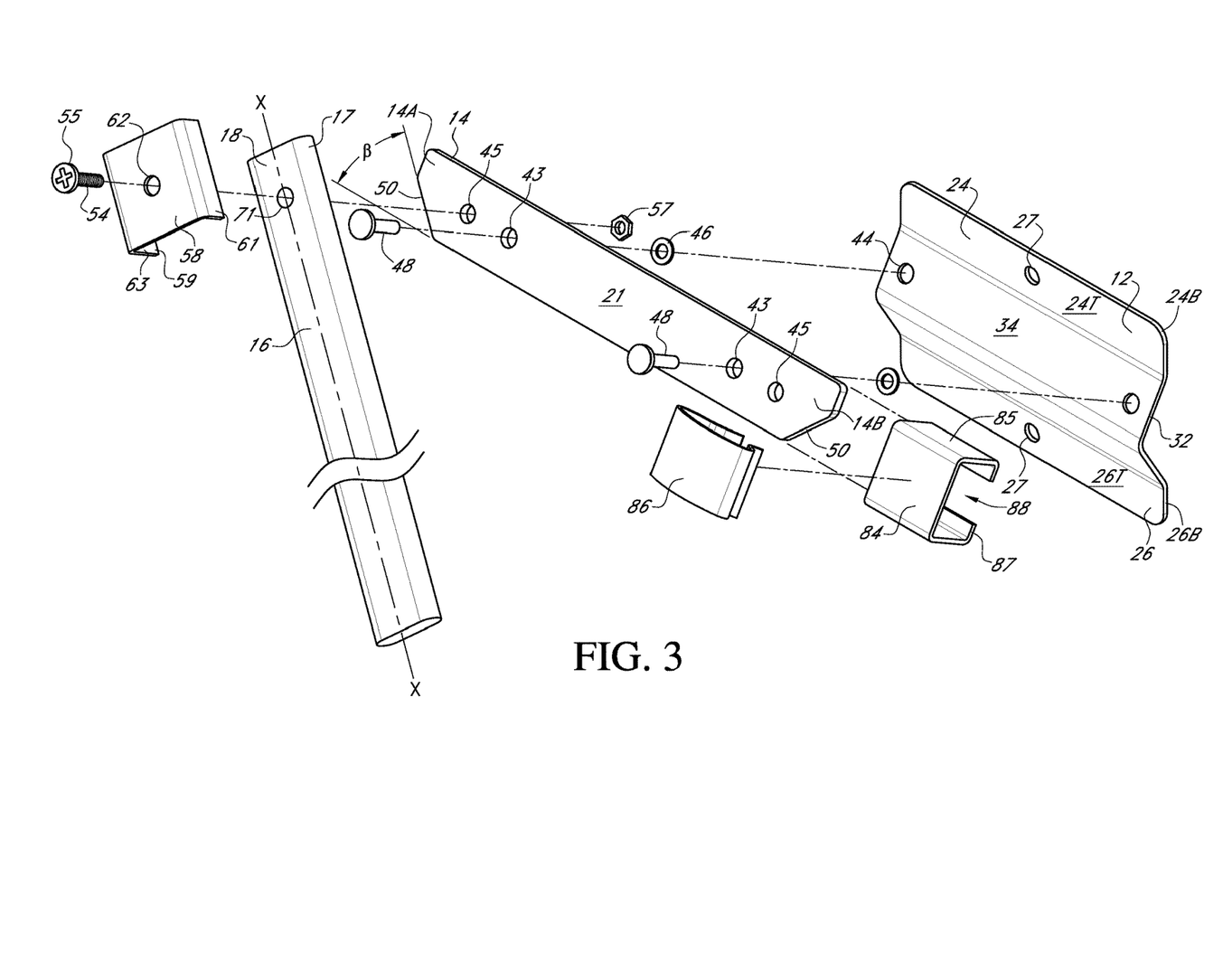
FIG. 3 is an exploded perspective view of the hanger device of FIG. 1 showing the component parts thereof.

FIGS. 1-3 illustrate an example embodiment hanger device 10 according to the present invention. The hanger device 10 includes a base plate 12, a slide bar 14, and a flexible strap 16. The strap 16 has a first end 18 and a second end 20 and defines a longitudinal axis X-X as shown on FIG. 3. An adjustable fastener 22 is coupled to the slide bar 14 and is configured to releasably attach the strap 16 to the slide bar 14 at a point on the strap between the first end 18 and second end 20 thereof.

Figure 4:
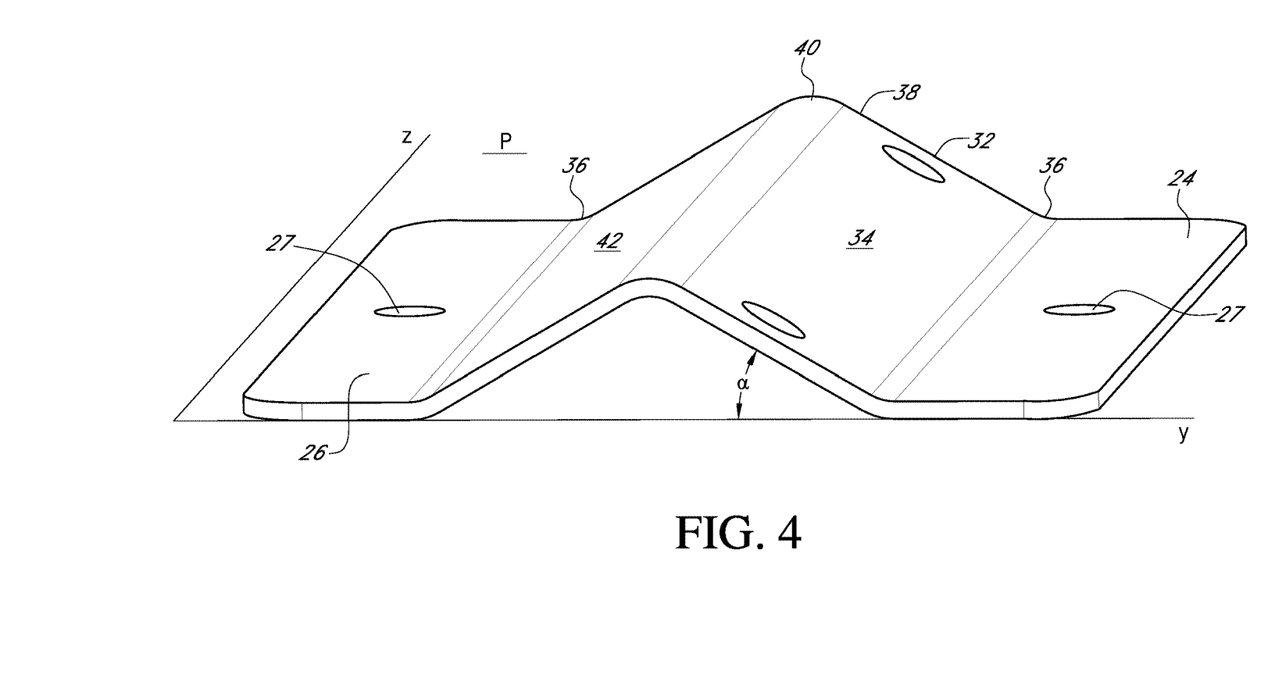
FIG. 4 is a perspective end view of the base plate of the hanger device of FIG. 1.

Referring to FIGS. 1, 3 and 4, the base plate 12 has a length L and defines first and second end plates 24, 26 respectively. The first end plate 24 is generally planar and defines each of a top surface 24T and bottom surface 24B. The bottom surface 24B is configured to abut and mount to a vertical surface (not shown in FIGS. 1-4) forming a wall mount for mounting the base plate 12, and hanger device 10 to the vertical surface. The first end plate 24 defines a mounting hole 27 extending through the end plate for securing the base plate 12 to the vertical surface. In other embodiments, more than one mounting hole may be used to secure the base plate to the vertical surface.

In the illustrated embodiment, the second end plate 26 is configured as a mirror image of the first end plate 24 and includes top and bottom surfaces 26T and 26B which are similar to the corresponding parts of the first end plate 24 and not described further herein. In other embodiments, the first and second end plates 24, 26 may be shaped differently one from the other. As shown in FIGS. 3 and 4, the first and second end plates 24 and 26 may be formed integrally from a single piece of flat stock having a pair of longitudinal bends 36 separating the first and second end plates 24, 26 from a center portion 38 of the base plate. The bottom surfaces of the first and second end plates 24B, 26B are aligned and define a common plane P identified by the axis labeled y and z in FIG. 4, so that the bottom surfaces 24B and 26B are positionable substantially flush against a generally flat vertical surface, e.g., a wall, for mounting the base plate 12 to the wall. In the illustrated embodiment, the base plate 12 is formed of a single piece of sheet metal having a thickness of ⅛ inch. However, in other embodiments the base plate 12 may be formed of other types of metal or plastic and have different dimensions, and be formed of more than one piece of stock. In one embodiment, the base plate 12 may be formed of galvanized sheet metal.

In another embodiment of the hanger device 10 (not shown) the base plate 12 includes only one end plate 24 configured as a wall mount for attaching the hanger device to a vertical surface.

Still referring to FIGS. 3 and 4, the center portion 38 of the base plate 12 includes a slide bar mount 32 configured to support the slide bar 14 mounted thereto. The slide bar mount 32 defines a mount surface 34 disposed at an acute angle α from the plane P defined by the bottom surfaces 24B, 26B of the first and second end plates 24, 26 respectively. In one embodiment, the angle α is about forty-five degrees. In another embodiment, the angle α is about forty degrees. In another embodiment, the angle α measures about fifty degrees. In other embodiments, the angle α is in a range between about thirty degrees and about sixty degrees. The angular position of the slide bar mount 32 relative to the end plates 24, 26 and bottom surfaces 24B, 26B, thereof, facilitates the positioning of a tool hanging from the hanger device 10 to be spaced apart from the vertical surface as will be discussed further following.

The center portion 38 of baseplate 12 defines a center bend 40 extending along the length L of the base plate and separating the slide bar mount 32 from a return surface 42. In the illustrated embodiment the return surface 42 is positioned at the same angle α relative to the plane P. In other embodiments the return surface 42 may be disposed at a different angle from the plane P than that of the slide bar mount 32.

The slide bar mount 32 defines a pair or mounting holes 44 for attaching the slide bar 14 to the slide bar mount via fasteners 48 such as screws or rivets. Likewise, the slide bar 14 defines a pair of mounting holes 43 aligned with the mounting holes 44 on the slide bar mount 32 for receiving the fasteners 48 therethrough. Spacers, such as washers 46 are disposed between the slide bar 14 and slide bar mount 32 so that the slide bar is spaced apart from the slide bar mount. In the illustrated embodiment the washers 46 are about ⅛ inch thick and positioned about the fasteners 48 between the slide bar 14 and the slide bar mount 32. In other embodiments the spacing between the slide bar 14 and the slide bar mount 32 may be in a range between about ⅛ inch and 3/16 inch depending on the configuration and flexibility of the slide bar 14 and/or adjustable fastener 22.

In one embodiment the slide bar 14 is formed of flat sheet metal 3/16 inch thick by ¾ inch wide and about five and ½ inches long. The mounting holes 43 on the slide bar 14 may be countersunk to receive the head of the fasteners 48 so a surface 21 of the slide bar 14 facing the flexible strap 16 is smooth and without obstructions protruding therefrom.

As shown in the illustrated embodiment, each of the opposing ends of the slide bar 14 are cut on an angle and define an angular surface 50. The angular surface 50 being disposed at an angle β relative to a length of the slide bar 14. In one embodiment the angle β is about 45 degrees. In other embodiments, the angle β may be in a range from about 40 degrees to about 50 degrees. In other embodiments, the angle β can be in a range between about thirty-five degrees to about sixty degrees. In the illustrated embodiment both of the first and second ends (14A, 14B) of the slide bar 14 define angular surfaces 50. In other embodiments, only one end of the slide bar 14 defines an angular surface 50.

The slide bar 14 defines a second set of mounting holes 45, one near each of the first and second ends (14A, 14B) thereof for receiving a fastener 54 for attaching the first end 17 of the flexible strap 16 to the slide bar.

The flexible strap 16 defines a first end 17 and second end 19 respectively. The first end 17 is fixedly attached to the slide bar via the fastener 54 which may be a bolt and nut as shown in FIG. 3. As shown in FIG. 3, the flexible strap 16 defines a hole 71 extending through the strap at a center of the width of the strap and near the first end 17 thereof. In one embodiment, the flexible strap is rubber formed from an extruded high density (80-85 durometer) Elastomeric-Propylene-Diene-Monomer (EPDM). In one embodiment, the length of the flexible strap 16 is in a range from about 10" to about 12". In the illustrated embodiment a width of the flexible strap is about ¾ inches and the thickness is about ¼ inch. A radius of curvature on the sides is about ⅛ inches. In one embodiment, the flexible strap 16 is configured to include one or more of the following characteristics: stretch resistance, resistance to taking a set after long periods of deformation, resistance to chemical degradation, resistance to compression, and resistance to heat and cold. Preferably, an outer surface of the flexible strap 16 is smooth to allow for the insertion and removal of implements through a spiral loop 80 formed in the flexible strap.

In other embodiments depending on the application thereof, the flexible strap can be of various lengths and thickness than that shown in the illustrated embodiment. For example, if used with heavy tools, the thickness of the flexible strap 16 may be thicker than ¼ inch, as will be apparent to one skilled in the art.

In other embodiments, the flexible strap may define a round or oval cross-section. Thus, although the illustrated embodiment shows a rectangular strap, straps having other shapes may also be used without departing from the disclosed invention. The shape of the keeper and/or tubular portion of the adjustable fastener can also be configured differently to accommodate a different shaped strap. Thus, the adjustable hanger device disclosed and claimed herein is not limited to the embodiment shown in the figures.

Referring to FIGS. 1-3, a keeper 58 is coupled to the first end 14A of the slide bar 14 and the first end 17 of the flexible strap 16 securing the first end of flexible strap to the slide bar. As shown in the figures, the keeper 58 is channel shaped having first and second legs 59, 61 extending generally perpendicular to, and outwardly from a center portion 60 thereof. A channel 64 is defined between the center portion 60 and the first and second legs 59, 61 respectively. In the illustrated embodiment, both of the first and second legs 59, 61 extend along an entire length of the channel 64.

Figure 7:
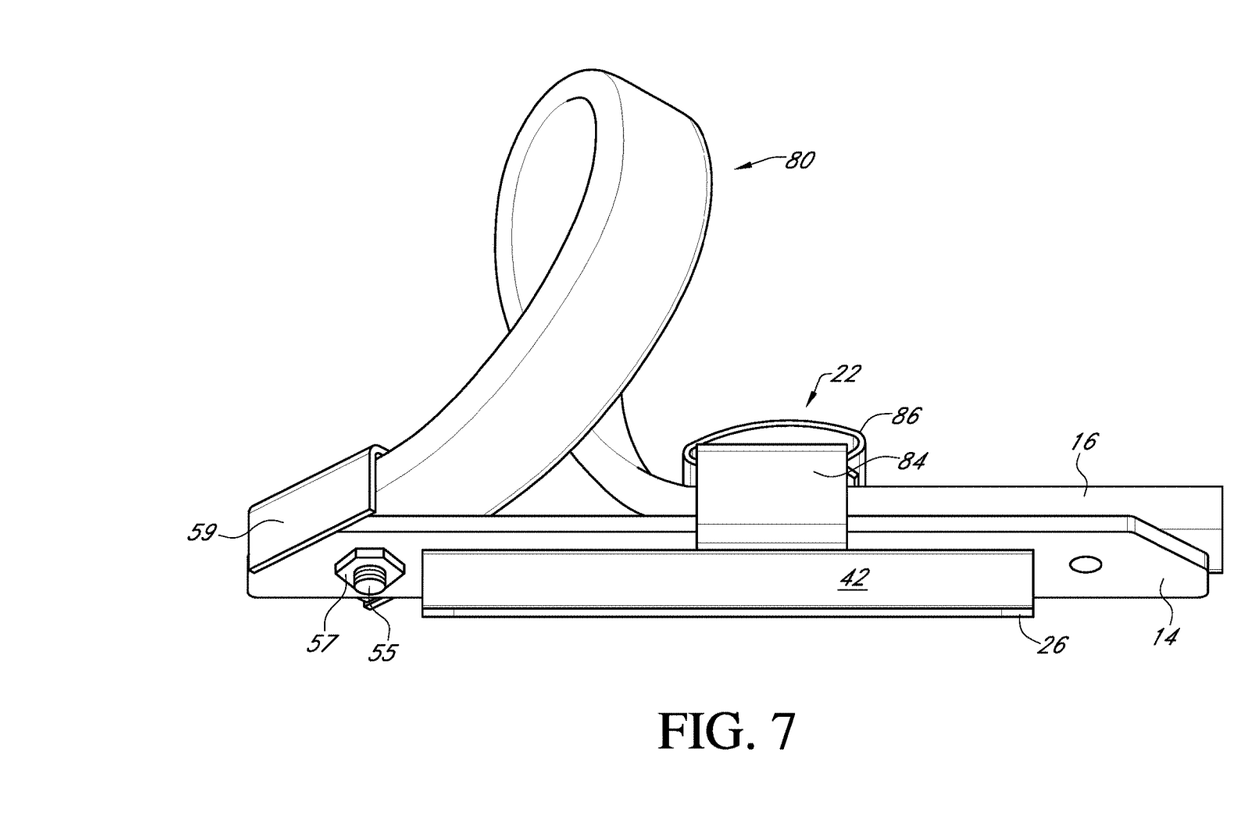
FIG. 7 is a perspective underside view of the hanger device of FIG. 1.

In one embodiment, the first leg 59 is longer than the second leg 61 in a direction perpendicular to a length of the channel 64. Thus, the first leg 59 extends outwardly from the center portion 60 of the keeper farther than the second leg 61. Referring to FIGS. 3 and 7, the first end 17 of the flexible strap 16 is positioned in the channel 64 and fixed to the slide bar 14 between the keeper 58 and the slide bar. An inside surface 63 of the first leg 59 of keeper 58 engages the angular surface 50 of the slide bar 14 so that the length of the flexible strap 16 is fixed at the angle β relative to the slide bar 14. As mentioned above, in one embodiment the first end 17 of the strap 16 is attached to the slide bar at angle β equal to about 45 degrees. A bolt hole 62 extends through the center portion 60 of the keeper. A corresponding hole 71 is defined by the flexible strap 16 near the first end 17 thereof. A fastener 54, e.g., a bolt 55 and nut 57, extends through the bolt hole 62 in the keeper 58, through the hole 71 in the flexible strap 16 and through the mounting hole 45 near the first end of the slide bar 14, and is secured with the nut 57 thereby attaching the flexible strap 16 to the slide bar 14. In another embodiment (not shown) the keeper may be u-shaped to accommodate a round or oval shaped strap.

Referring again to FIG. 1, the flexible strap 16 is twisted axially to form the spiral loop 80 with the second end 19 of the flexible strap 16 extending through the adjustable fastener 22 and positioned adjacent to and extending along the length of slide bar 14. The adjustable fastener 22 being configured to secure the flexible strap 16 to the slide bar 14 at a point between the first and second ends 17, 19 of the flexible strap. The flexible strap 16 being adjustably coupled to the slide bar 14 so that a size or diameter of the spiral loop 80 is variable for accommodating tools, implements, and/or handles thereof of various dimensions. The adjustable fastener 22 releasably fixes a position of the flexible strap 16 relative to the slide bar 14 for maintaining the spiral loop 80 formed in the flexible strap and adjusting the size and interior diameter thereof.

Referring to FIGS. 1-3, 9, and 10, in the illustrated embodiment the adjustable fastener 22 is a strap clip 23 which includes a slide member 84 and a spring clip 86. The slide member 84 is tubular defining a rectangular shaped tube 85. One sidewall 82 of the tube 85 defines an opening 83 through the length L2 of the tube 85 for allowing assembly of the slide member onto the slide bar 14 while the slide bar 14 is secured via fastener 48 to the slide mount 32. The opening 838 being sized so that the fastener 48 passes therethrough during assembly of the slide member 84 onto the slide bar 14. An interior width W of the tube 85 is dimensioned to receive the width of the flexible strap 16 therethrough in a loose fit arrangement, wherein the flexible strap is slidable relative to the tube 85 while the length L2 of the flexible strap is maintained generally aligned with the length of the slide bar 14 via the length of the slide member 84 and tube 85 thereof. The tube 85 being slidable along a length of the slide bar 14 for adjustably fixing a size or diameter of the spiral loop 80 as set forth above. An interior height h of the tube 85 being about three times the thickness of the flexible strap 16 for accommodating each of the slide bar 14, the flexible strap 16 and one leg of the spring clip 86 in a stacked position one atop the other within the interior of the tube 85.

Figure 9:
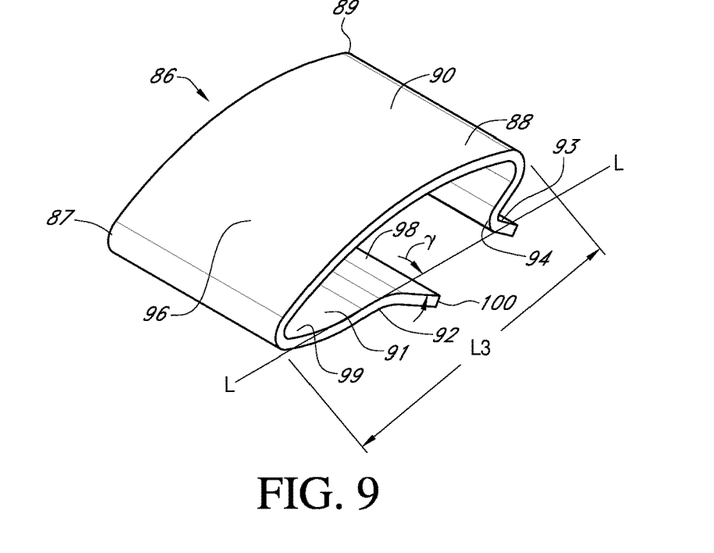
FIG. 9 is a perspective view of a spring clip in accordance with one embodiment of the present invention.
Figure 10:
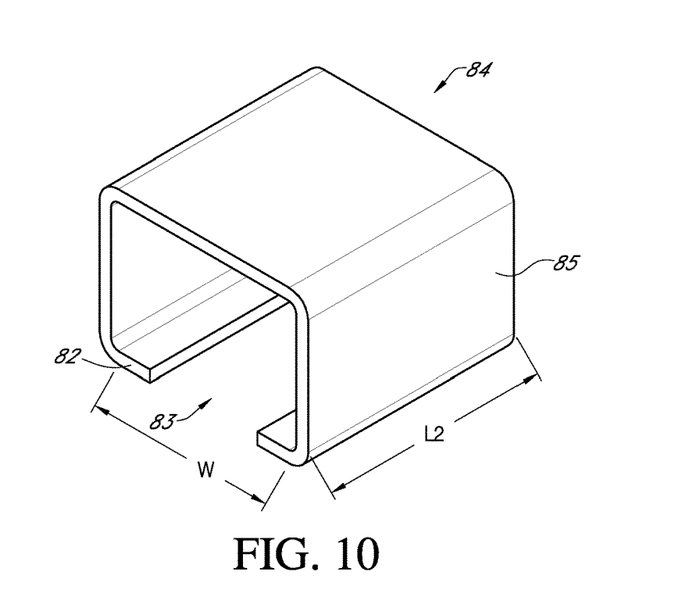
FIG. 10 is a perspective view of a slide member in accordance with one embodiment of the present invention.

As shown in FIGS. 3 and 9, in the illustrated embodiment, the spring clip 86 is formed of a steel strap 88 having a first bend 87 through a width thereof. The first bend 87 being disposed between a first leg 90 and a second leg 92 of the spring clip 86. Each of the first and second legs 90, 92 extending outwardly from the first bend 87 in generally the same direction. The first leg 90 defining an arched portion 96 between the first bend 87 and a second opposing bend 89. The second bend 89 also extends across the width of the spring clip and is disposed in a direction opposite the first bend 87. A third bend 93 extends through the width of the spring clip 86 near an end of the first leg 90 and defines a lip 94. The first bend 87 being approximately perpendicular to the length of the steel strap 88 so that the first and second legs 90, 92 are aligned generally one with the other along the lengths thereof. The first leg 90 overlying the second leg 92 forming an interior space 91 between the first and second legs 90, 92. The arched portion 96 being generally convex in a direction away from the interior space 91. As shown in FIG. 9, a length L3 of the spring clip corresponds generally to the length of the arched portion 96 of the first leg 90.

The second leg 92 of the spring clip 86 defines a tab 98 at a terminal end 100 of the second leg for engaging the flexible strap 16 within the tube 85 and securing the flexible strap between the tab and the slide bar 14. The tab 98 extending at an angle gamma, γ relative to a line L-L extending parallel to the length L3 of the spring clip 86. In one embodiment the angle γ is about thirty-five degrees. In other embodiments, the angle γ is in a range from about thirty degrees to about fifty degrees. The terminal end 100 of the tab 98 being configured to engage the flexible strap 16 and secure a position of the flexible strap 16 against the slide bar 14 and thereby the size and position of the spiral loop 80. In the illustrated embodiment, the terminal end 100 of the tab 98 forms a straight edge configured to engage an outer surface of the flexible strap 16. In other embodiments, the terminal end 100 of the tab 98 defines a sawtooth edge for engaging a surface of the flexible strap 16. The sawtooth edges can be rounded to prevent damage to the surface of the flexible strap yet still ensure a secure engagement between the tab 98 and the flexible strap 16.

The second leg 92 further defining a curved segment 99 extending between the first bend 87 and the tab 98, the curved segment 99 being generally convex in a direction outwardly from the interior space 91. The curved segment 99 configured to position the terminal end 100 of the tab 98 into an engaged position with the flexible strap 16 when the spring clip 86 is coupled to the slide member 84 and secured thereto via the lip 94.

FIG. 7 shows an underside of the hanger device 10 of FIG. 1. The illustration shows the return surface 42 extending outwardly from the second end plate 26. FIG. 7 also shows the angular position of the slide bar 14 relative to a plane of the end plate 26. This angle, α mentioned above, facilitates the tool/implement being hung via the hanger device 10 to be spaced apart from the vertical surface supporting the hanger device.

In use with the present invention hanger device 10, the strap clip 23 secures the flexible strap 16 to the slide bar 14 thereby releasably fixing the size and position of the spiral loop 80 formed in the flexible strap. Assembled as set forth above and shown in FIGS. 1 and 2, the hanger device 10 includes the flexible strap 16 being twisted axially to form the spiral loop 80 therein. The second end 19 of the flexible strap 16 extends through the tube 85 of the slide member 84 so that the second end of the flexible strap is aligned with the length of the slide bar 14. The spring clip 86 is then coupled to the slide member 84 with the second leg 92 of the spring clip extending into the tube 85 and the arch portion 96 overlying the tube 85. Each of the flexible strap 16 and the slide member 84 is then moved relative to the slide bar 14 to a selected position so that the spiral loop 80 is sized to receive a handle or portion of a tool or implement therethrough for hanging the tool/implement via the hanger device 10. Once the flexible strap 16 and slide member 84 are in the selected position, a user pushes down on the arched portion 90 of the spring clip 86 to engage the lip 94 with the open end of the tube 85 thereby causing the tab 98 of the second leg 92 of the spring clip 86 to forcibly engage a surface of the flexible strap 16 and secure the position of the flexible strap adjacent the slide bar 14. As shown in FIGS. 1 and 2, the strap clip 23 is configured to be used with the tab 98 extending away from the spiral loop 80 of the flexible strap 16 to ensure a secure engagement of the tab with the surface of the flexible strap. Due to the configuration of the spring clip 86 as the tool/implement 108 pulls downwardly on the flexible strap 16, the engagement between the tab 98 and the flexible strap 16 tightens ensuring the tool/implement is securely supported by the hanger device.

Figure 5:
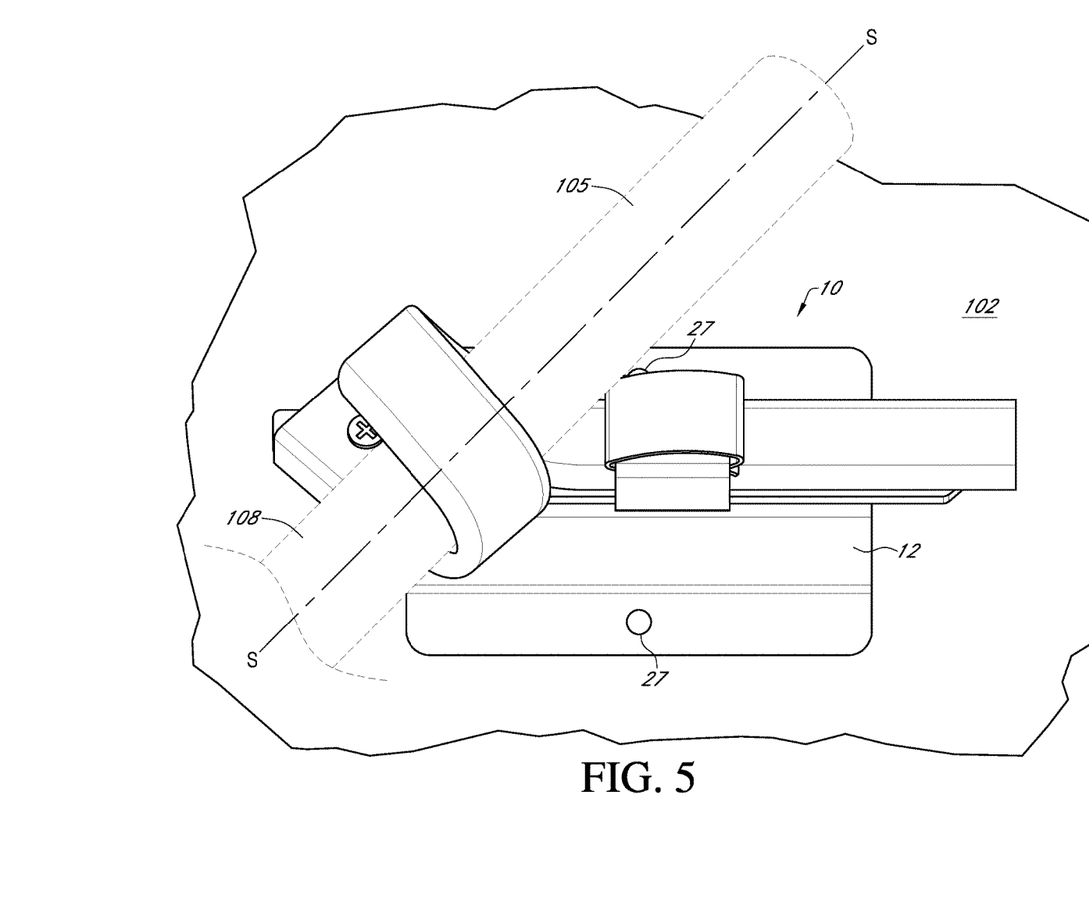
FIG. 5 is a perspective view of one embodiment of a hanger device in accordance with the present invention shown with a handle of an implement in broken lines shown on an angle and inserted into the loop of the strap.

Referring now to FIG. 5, the hanger device 10 of FIG. 1 is shown attached to a wall 102 through hole 27 via a screw (not shown). A handle 105 of a tool/implement 108 is shown aligned with the opening of the spiral loop 80 along an axis identified as S-S on FIG. 5, and inserted through the opening for hanging the tool/implement via the hanger device 10. The illustration of FIG. 5 represents a first step of hanging the tool/implement 108 via the hanger device 10. Once the handle 105 is inserted through the spiral loop 80, the handle can be released and allowed to return to a vertical position via the force of gravity. Note the angle of the opening of the spiral loop 80 is approximately equal to the angle β described above as the angular position of the first end 17 of the flexible strap 16 relative to the length of the slide bar 14.

Figure 6:
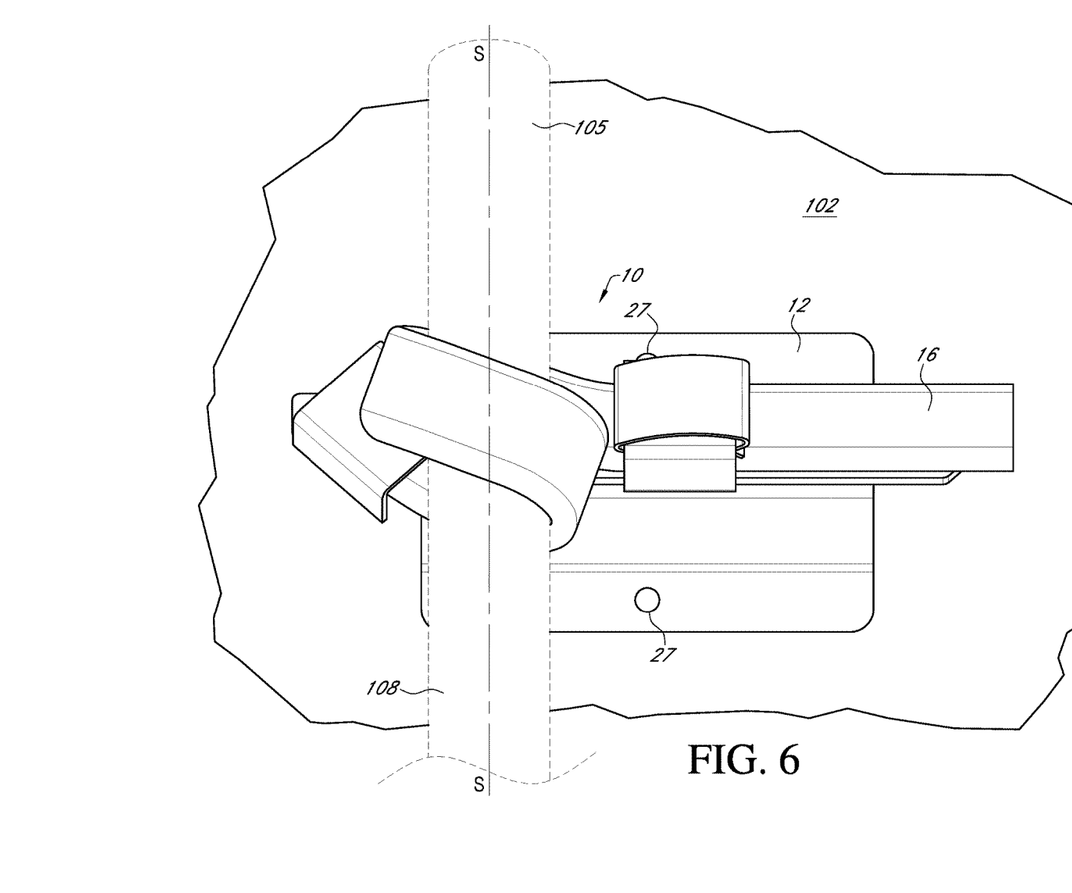
FIG. 6 is a perspective view of the embodiment of FIG. 6, shown with the handle of the implement in a vertical position suspended from the hanger device.

Referring to FIG. 6, once the handle 105 is released, the handle moves to a vertical position due to the force of gravity, thereby causing the flexible strap 16 at the spiral loop 80 to tighten about the handle securing the handle and attached tool/implement 108 in a hanging position relative to the hanger device 10 and the wall 102.

Figure 8:
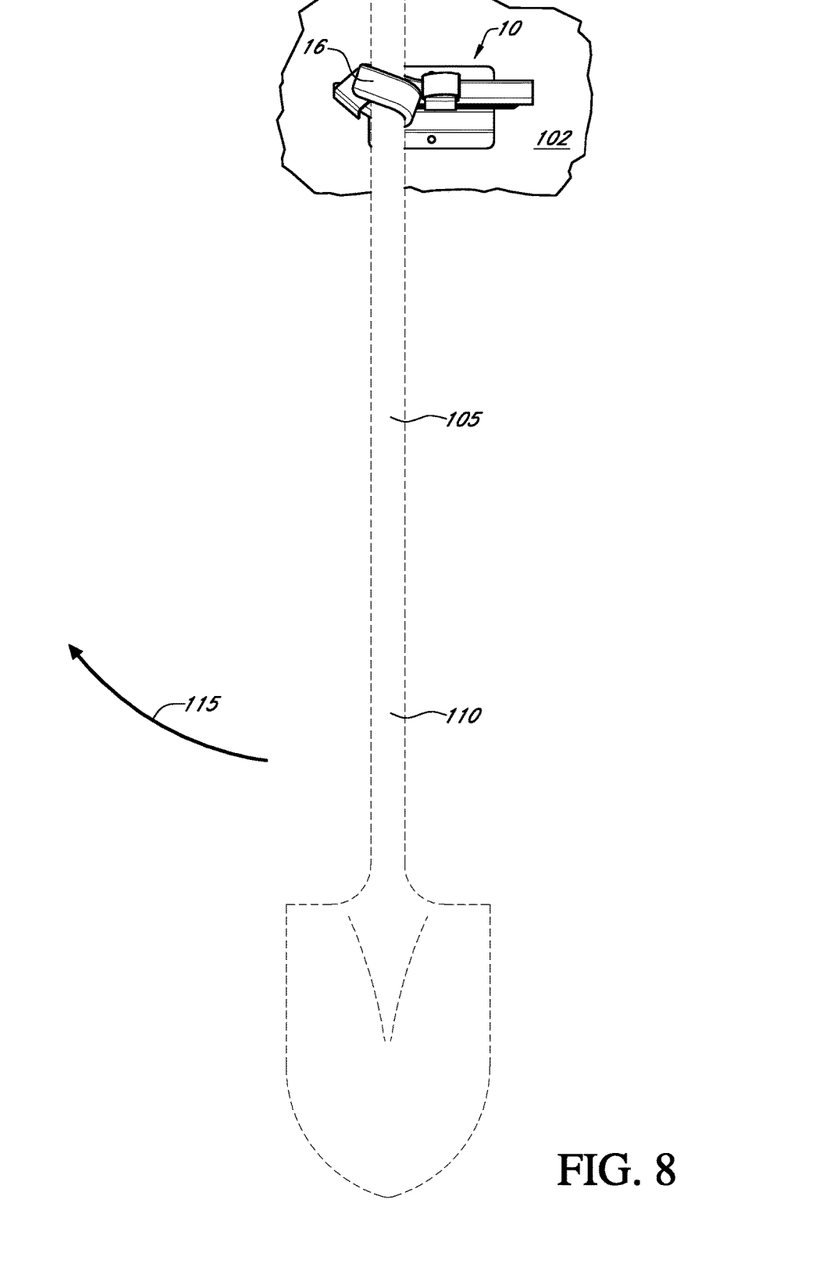
FIG. 8 is a perspective view of the hanger device of FIG. 1 shown as used supporting a shovel hanging therefrom.

FIG. 8 shows a shovel 110 having a handle 105 suspended from a hanger device 10 in accordance with the present invention. The hanger device 10 is mounted to a wall 102 as discussed hereinabove. To remove the shovel 110 from the hanger device 10, a user moves the handle of the shovel in a direction indicated by the arced line 115. Once the handle is raised to approximately the angle β relative to the slide bar 14, the handle 105 is released from the flexible strap 16 and can be removed from the spiral loop 80. When the handle 105 is raised to approximately the angle β relative to the slide bar 14, the spiral loop 80 returns to its normal position shown in FIG. 1, wherein the handle 105 is loose fit within the spiral loop. Thus, the handle 105 can be removed from within the spiral loop 80 when the handle is at the angle β relative to the slide bar 14.

In the illustrated embodiment of the hanger device 10, the configuration of the strap 16 and the angular disposition of the slide bar relative to the base plate 12, allows for a user to tilt the handle of the implement away from the wall 102 prior to moving the handle 105 in a direction of the arced line 115. In one embodiment, a lower end of the tool/implement 108 can be moved away from the wall in a range between about 10 inches to about 20 inches so that tool/implement can be removed from the hanger device 10 without disturbing adjacent tools. Thus, the hanger device 10 can be used with multiple other hanger devices 10 according to the present invention in a closely packed, high density configuration wherein multiple tools/implements can be stored hanging against the wall 102 while using only minimal wall space.

Referring again to FIGS. 1 and 8, since the handle 105 must be moved towards the left (when facing the paper of FIG. 8) along the arced line 115 to either hang the tool/implement 108 via the hanger device 10, or remove the tool/implement from the hanger device, the embodiment of the hanger device 10 of FIG. 1 may be referred to as a left-hand hanger device 10. Whereas, in the FIG. 2 embodiment, the first end 17 of the flexible strap 16 is attached to the second end 14B of the slide bar 14 such that the tool/implement 108 would need to be moved towards the right (when facing the page) to hang or de-hang the tool/implement from the hanger device 10. Thus, the hanger device 10 of FIG. 2 is configured as a "right-hand" hanger device.

As will be apparent to one skilled in the art, depending on the application or configuration of the wall 102 or other vertical structure and/or adjacent walls or structures or access to the vertical structure, either of a left hand hanger device or a right hand hanger device may be more useful to store tools/implements.

In the illustrated embodiment, the hanger device 10 is configured to be used as either a left-hand hanger device or a right-hand hanger device by simply removing the first end 17 of the flexible strap 16 from the slide bar 14 and re-attaching the same to the opposite end 14A, 14B of the slide bar. Also, the spring clip 86 will need to be decoupled from the slide member 84 and recoupled thereto so that the tab 98 thereof faces away from the first end 17 of the flexible strap 16. In other embodiments, the hanger device 10 may be configured as only a right-hand hanger device or only a left-hand hanger device.

Example embodiments and methods thus being described, it will be appreciated by one skilled in the art that example embodiments and example methods may be varied through routine experimentation and without further inventive activity. For example, while the disclosure describes foil apparatus useable with a paper making machine, internal spacing elements or other intermediate elements and/or variations of the disclosed embodiments may be used in connection with the foil apparatus described herein and achieve the same functions as disclosed herein. Variations are not to be regarded as departure from the spirit and scope of the exemplary embodiments, and all such modifications as would be obvious to one skilled in the art are intended to be included within the scope of the following claims.

What is claimed is:

1. An adjustable strap clip for securing a strap to a slide bar, the adjustable strap clip comprising:
    a slide member defining a tubular shape and having an opening extending through a length thereof, the opening defining a width configured to receive a portion of a strap therethrough;
    the slide member configured to receive a slide bar through the opening, the slide member being slidable along a length of the slide bar;
    a spring clip defining a first bend extending through a width of the spring clip including first and second legs extending outwardly from the first bend in generally the same direction, the spring clip being engageable with the slide member for securing the strap to the slide bar.

2. The adjustable strap clip according to claim 1 wherein the first leg of the spring clip defines an arched portion extending between the first bend and a second bend opposing the first bend.

3. The adjustable strap clip according to claim 1 wherein the second leg of the spring clip defines a tab for engaging the strap within the tube and securing the strap between the tab and the slide bar.

4. The adjustable strap clip according to claim 2 wherein the first leg of the spring clip defines a third bend extending through the width of the spring clip near an end of the first leg, the third bend defining a lip, the lip being engageable with the slide member at the opening thereof for securing the strap to the slide bar.

5. The adjustable strap clip according to claim 2 wherein the first leg of the spring clip overlies the second leg of the spring clip forming an interior space between the first and second legs, the arched portion being generally convex in a direction away from the interior space.

\* \* \* \* \*